United States Patent [19]

Bailey

[11] 4,242,863
[45] Jan. 6, 1981

[54] DUAL PHASE FUEL VAPORIZING COMBUSTOR

[75] Inventor: John M. Bailey, Dunlap, Ill.

[73] Assignee: Caterpillar Tractor Co., Peoria, Ill.

[21] Appl. No.: 887,149

[22] Filed: Mar. 16, 1978

[51] Int. Cl.$^2$ .............................................. F02C 7/22
[52] U.S. Cl. ..................................... 60/39.06; 60/738
[58] Field of Search ............ 60/39.71, 39.74 R, 39.06; 431/3, 171

[56] References Cited

U.S. PATENT DOCUMENTS

| | | | |
|---|---|---|---|
| 2,706,889 | 4/1955 | Allen et al. | 60/39.71 |
| 3,398,528 | 8/1968 | Nakamura et al. | 60/39.71 |
| 3,851,462 | 12/1974 | Vranos | 60/39.06 |
| 4,085,581 | 4/1978 | Carvel et al. | 60/39.71 |

FOREIGN PATENT DOCUMENTS

| | | | |
|---|---|---|---|
| 218888 | 3/1958 | Australia | 60/39.71 |
| 412064 | 6/1934 | United Kingdom | 431/3 |

Primary Examiner—Robert E. Garrett
Attorney, Agent, or Firm—Sixbey, Bradford, Leedom

[57] ABSTRACT

A dual phase fuel vaporizing combustor, and method for burning, in an annular vaporizing combustor, high viscosity, high carbon/hydrogen ratio hydrocarbon fuels, including such as residual fuels, low grade synfuels and coal-oil slurries. A dual phase vaporizer tube receives alternating introductions of a fuel air mixture of high fuel content, and then a hot air or low fuel content mixture, to alternately initially discharge from the tube a vapor stream of combined air and partially vaporized fuel, the initial vapor stream impinging onto a hot surface where more volatile portions of fuel will vaporize and burn, while less volatile heavier fuel components will form a hot carbon deposit on the surface; and alternately and sequentially discharge from the tube a hot, highly oxidizing stream with little or no fuel and impinge the sequential stream onto the carbon deposit on the hot surface and thereby promote substantial burning of the carbon.

25 Claims, 9 Drawing Figures

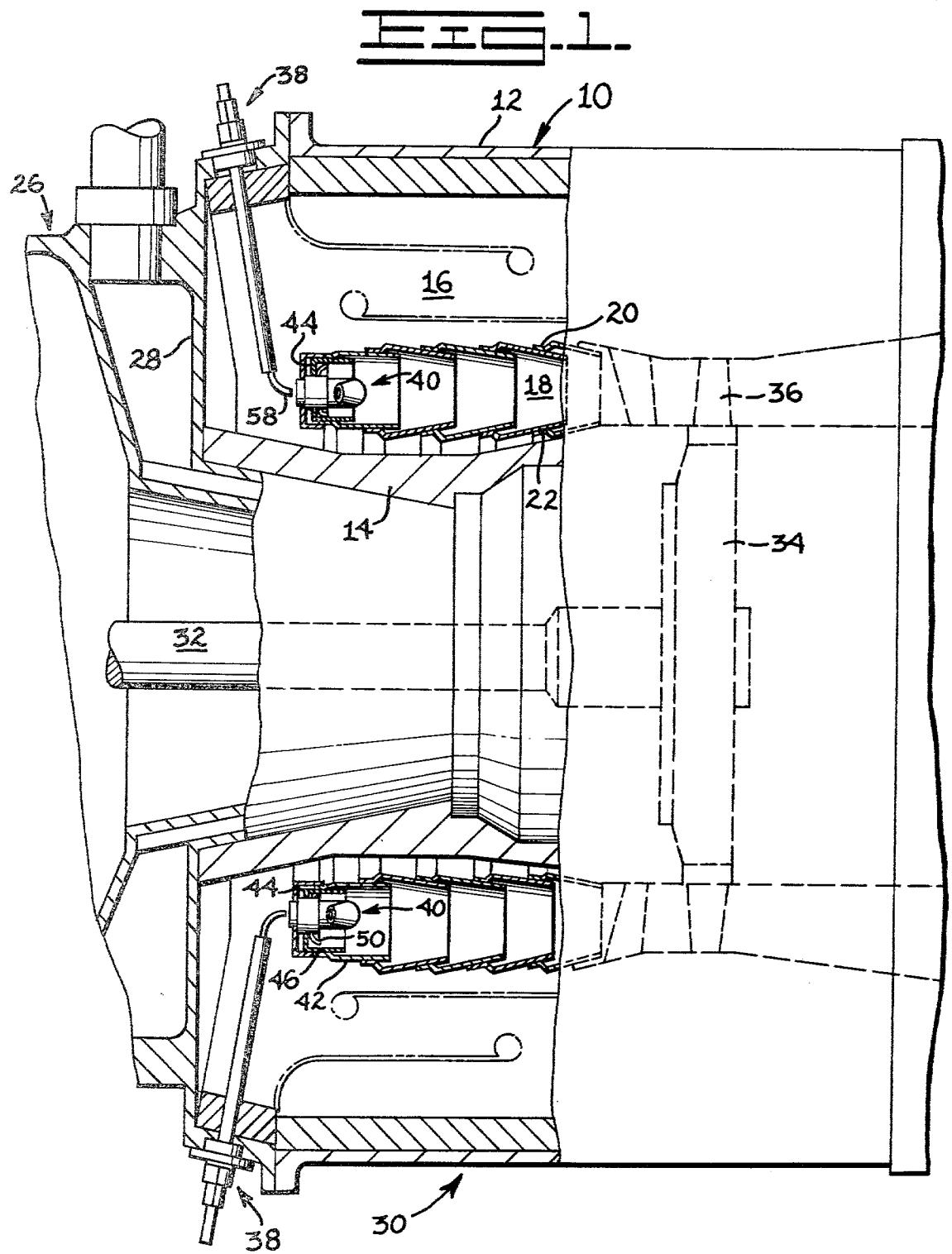

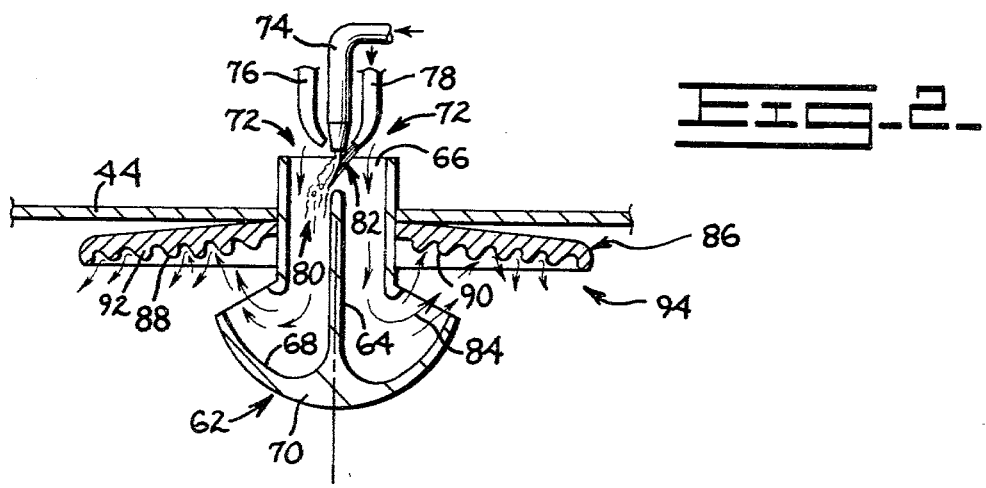
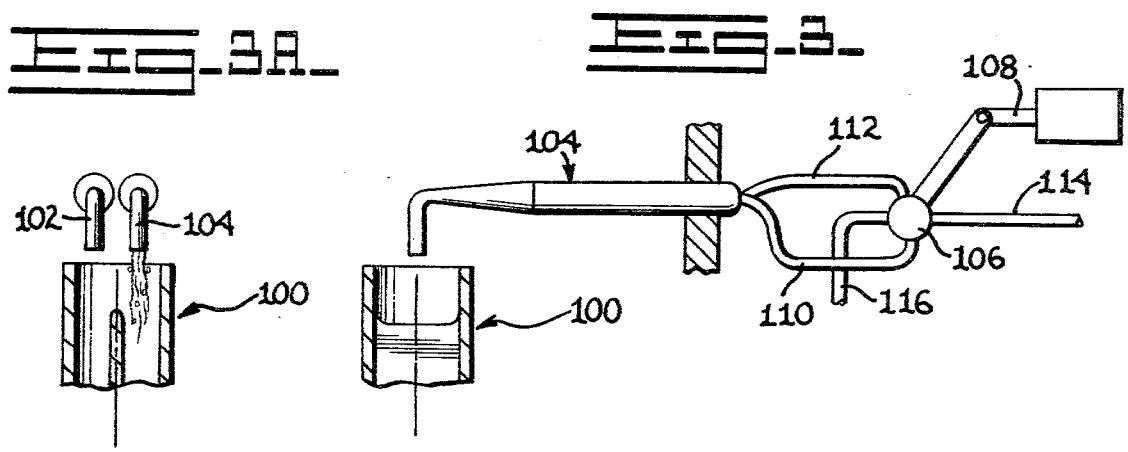
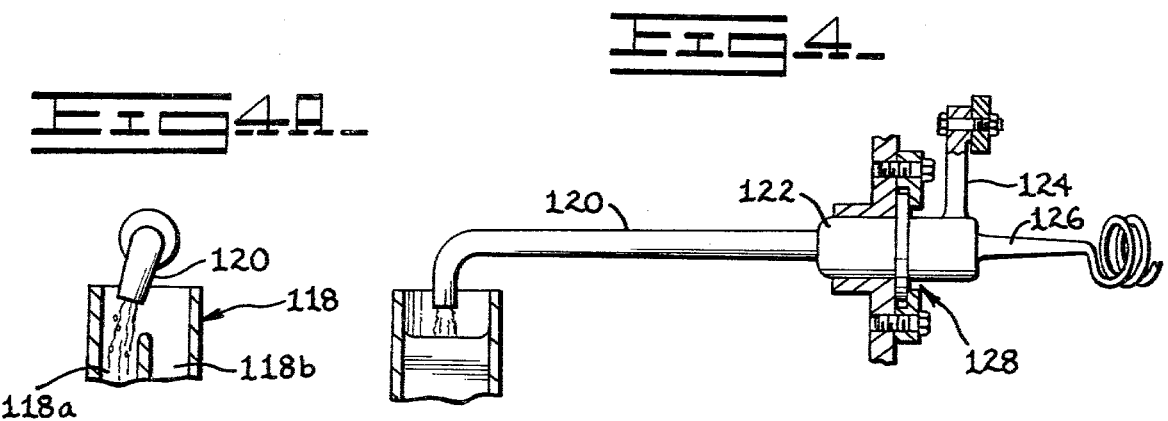

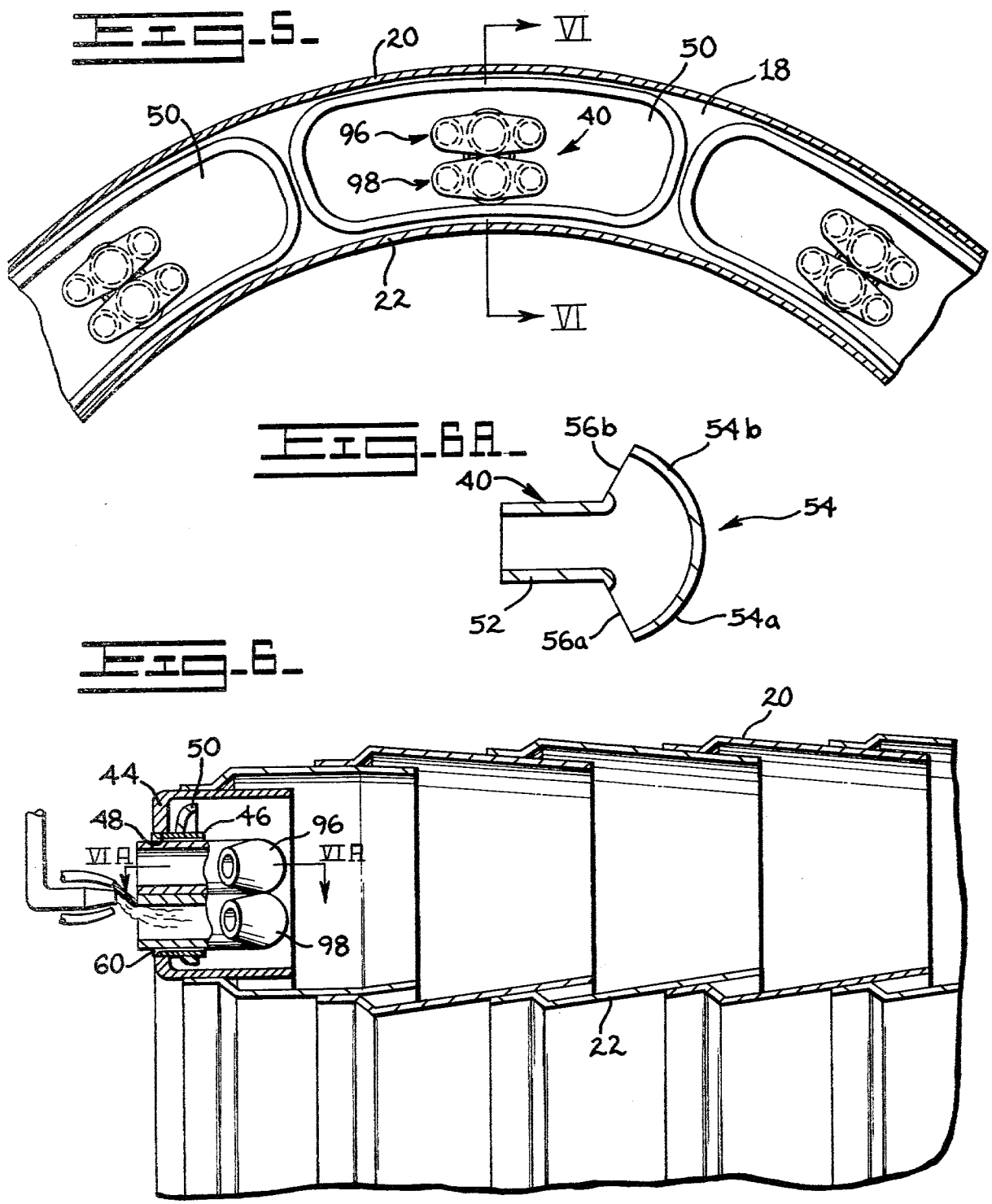

DUAL PHASE FUEL VAPORIZING COMBUSTOR

BACKGROUND OF THE INVENTION

The present invention relates generally to vaporizing type combustors for use in gas turbines.

Gas turbine combustors are very efficient and capable of high performance emissions and life when fueled with jet fuels, kerosene or natural gas. Performance and emissions are acceptable with fuels as heavy as No. 2 diesel fuel, for example, although life problems may be caused by carbon deposits which result from heavier and more aromatic fractions. Such life problems, however, can generally be overcome by attention to design details.

Serious problems, however, can result when attempting to use so called residual fuels. Fuels of this nature are extremely difficult to atomize to the very fine droplets required for substantially free combustion. In order to assist in atomization or vaporizing, high power external air systems, or generally high pressure systems have been used. When burning or using residual fuels in vaporizing combustors, it has been found that carbon deposits are likely to be produced which can break off as "clinkers". Similar problems are encountered with certain heavy syncrudes made, for example, from coal or shale, unless refined to a high degree by hydrogenation. This treatment increases fuel cost and requires greater capital investment. Operation on slurries of powdered low sulphur, low ash coal and oil, even though desirable, would entail similar problems, and therefore is less desirable than better grades of fuel.

Vaporizing type combustors previously used and known in the art include the use of so called fuel vaporizing tubes. The vaporizing tubes are operable to receive a fuel-air mixture and subject the same to heat for at least partial vaporization of fuel, the mixture then being exhausted into a combustor or burner of, for example, an annular vaporizing combustor of a type being developed by the assignee of the present application.

An example of this type of gas turbine combustor is disclosed in U.S. Pat. No. 4,030,288, owned by a common assignee with the present application, U.S. Pat. No. 3,913,318, U.S. Pat. No. 3,757,522 and others. Fuel vaporizing tubes shown in these prior patents have included so called "candy cane types" or "T-type", the "T-type" being a double armed candy cane configuration. Problems have sometimes existed when using such vaporizing tubes and burners, and especially it has been found that carbon may form in various parts of the vapor tube per se, and/or on other parts of the burner such as head plates, or splash plates.

Such carbon can build up and may break away and cause erosion, or flow may be impeded. Other problems or difficulties in operation and function have also occurred.

A co-pending application assigned to a common assignee herewith, namely application Ser. No. 860,644, filed Dec. 14, 1977, and entitled FUEL VAPORIZING COMBUSTOR TUBE, teaches an improved fuel vaporizing tube which provides greater life and reliability, and at least in part overcomes problems resulting from formation of carbon.

DESCRIPTION OF THE PRIOR ART

Heretofore gas turbine combustors such as annular vaporizing combustors have been used. In such apparatus a fuel and air mixture is directed into and through a fuel vaporizing tube wherein the fuel is partially vaporized, and a stream of air, vapor and liquid fuel exits from an arm or leg and in a generally reverse direction, and the stream is blown against or impinges on a surface of a head plate for example. It has been found that only a small percentage of certain heavier fuels, such as No. 2 diesel, are vaporized while passing through the vaporizing tube. The liquid fuel remaining in the vapor stream is subsequently deposited, by aid of the air stream, in a thin film on a surface of the head plate, or a splash plate if used, on which it vaporizes and burns. Heat from combustion is continually supplied on the fuel film, and the head plate material and construction. Carbon deposits can form in the vicinity of the head plate unless holes are provided in sufficient number and size to supply air to these areas. While it has been assumed that this air functions to prevent locally over rich fuel-air regions in the primary zone, it has also been found that carbon deposits, when and if formed, can be eliminated in a substantially efficient manner utilizing a construction as shown and described in the aforesaid patent application Ser. No. 860,644, and particularly with reference to use of a plurality of anti-carbon holes formed in shrouds surrounding the bases of the vaporizing tubes. These anticarbon holes are so oriented and operable that air entering the shrouds is discharged through the holes to impinge upon areas of splash plates, and by an air wiping or knocking-off action tend to eliminate a carbon build up in this area. The construction set forth in that application has refinements which additionally increase efficiency of operation and a decrease in carbon formation and the drawbacks and difficulties encountered therefrom.

Even with such improvements, however, formation of carbon deposits is to be expected or anticipated in combustors using high viscosity, high carbon/hydrogen ratio hydro/carbon fuels, including low grade synfuels and coal-oil slurries.

The present invention is directed particularly to a combustor to provide means for, and a method of, efficiently burning high viscosity, high carbon/hydrogen ratio carbon fuels including residual fuels, low grade synfuels and coal-oil slurries and the like.

SUMMARY OF THE INVENTION

The present invention accordingly is directed to a construction in a fuel vaporizing type of combustor for gas turbines wherein heavy and highly carbonaceous portions of fuel can be efficiently burned, especially in a gas turbine combustor when utilizing fuels of lower grades having tendencies to difficulties of vaporization and complete burning, resulting in carbon deposits on, for example, head plates and/or splash plates if used.

It has been found from tests conducted, and experience has proven out, that such carbon deposits as might be formed as a result of lower grade fuel use will burn away completely if at high temperature and in the presence of a lean or oxidizing air stream. It has also been ascertained that where carbon deposits were formed in certain furnaces or combustors, if fuel feed was discontinued or shut off, then carbon deposits were totally or substantially consumed in the presence of a continuing air flow in a relatively brief period of time. This result suggested that carbon can be efficiently burned in a gas turbine combustor providing that the carbon, once formed, is retained as a deposit to provide adequate residence time so that with impingement of a lean or highly oxidizing air stream the carbon would be substantially fully burned. It is also known that if the carbon were in the form of free soot or large "clinkers", it might be carried out of the combustion zone before it could be completely burned. These facts have resulted in the present new design, and method of utilizing combustors especially intended to burn heavy, highly carbonaceous fuels.

As will be pointed out in detail hereinafter, the desired end result is obtained by utilizing alternating and sequential introduction of a high fuel content fuel-air mixture into and through a vaporizing tube, with a subsequent or sequential flow therethrough of a lean fuel-air mixture or even air alone, the latter flow when impinging upon deposited carbon tending to implement or cause substantial combustion and burning of the carbon. More specifically, different means and structures have been devised to accomplish this overall end result. The features, as will appear more specifically hereinafter, serve separately, and additively in combination, to provide a substantial improvement in the art of vaporizing and burning of heavy and highly carbonaceous portions of fuel in vaporizing types of combustors for use in gas turbines.

Additional objects, features and advantages of the invention will be more readily apparent from the following detailed description of embodiments thereof, when taken together with the accompanying drawings in which:

FIG. 1 is a fragmentary elevational view of a portion of a vaporizing type gas turbine, partially broken away, and showing vaporizing combustor tubes and associated mechanism within an annular burner;

FIG. 2 is a fragmentary enlarged view, partially in section, of a dual passage vaporizing combustor tube design and associated structure operable for practicing the present invention;

FIG. 3 is a schematic view of a modified form of the invention utilizing two fuel tubes, with means for operatively and sequentially injecting fuel into one or the other side of a dual passage vaporizing tube, while the other fuel tube is shut off and purged to prevent internal carbon deposits;

FIG. 3A is a fragmentary view, partially in section, showing discharge from the plural fuel tubes into a dual passage fuel vaporizing tube;

FIg. 4 is a view similar to FIG. 3, disclosing an oscillating single fuel tube operable for sequentially introducing fuel respectively into the dual passages of the vaporizing tube;

FIG. 4A is a fragmentary enlarged view, partially in section, showing the dual vaporizing tube and oscillatable single fuel tube of FIG. 4;

FIG. 5 is a fragmentary view of a section of an annular chamber showing a further modification utilizing plural vaporizing tubes in a side by side disposition;

FIG. 6A is an enlarged sectional view through a vaporizer tube construction per se generally taken on line 6A—6A of FIG. 6.

Referring now in detail to the drawings, there is shown in FIG. 1 only such portions of a gas turbine construction as are necessary to provide a setting for an explanation and understanding of the present invention, reference again being made to U.S. Pat. No. 4,030,288, and co-pending application Ser. No. 860,644, both assigned to the assignee of the present application, for a more complete and detailed showing of a turbine of the type shown in FIg. 1 and of fuel vaporizing tubes used therein.

Basically, however, a gas turbine generally designated 10 includes an outer case 12 and an inner case 14 which, as is usual, are substantially coaxial and define therebetween an annular chamber or space 16 within which an annular burner or combustion chamber 18 is mounted. As is usual, the annular burner includes an outer wall 20 and an inner wall or liner 22. Additionally, as is usual, a compressor passage leads from the compressor section, generally designated 26. An end wall or cap 28 is provided at the end of the gassifier section or module generally designated 30. A shaft 32 extends through the compressor passage, and leads to a compressor section and mechanism therein, not shown. The opposite end of the shaft carries a gassifier turbine wheel generally designated 34 with the usual blades 36. The foregoing is of a known construction, as evidenced in the aforesaid patent.

The annular burner 18 has, as is usual, a plurality of fuel inlet tubes, the overall units being designated 38, and which are spaced annularly and functionally to introduce fuel into the vaporizer tubes of the invention indicated generally at 40. The fuel inlets and the vaporizing tubes are spacedly positioned with respect to the annular burner in a known manner, which can be seen from FIG. 5 of the drawings showing a fragment of the annular burner and vaporizer tubes 40 therein. The annular burner 18 includes a plurality of sections 42 and a head plate 44, with usual support means as shown. The head plate has a plurality of openings for positionment of the multiple vaporizing tubes and associated mechanism. The head plate as associated with the annular burner is more clearly shown in FIG. 6. Operatively positioned within the openings are the vaporizing tubes 40 and associated mechanisms, including for each a surrounding and spaced shroud 46 which is mounted within openings 48 in the head plate, with the shroud being attached to the tube. The apparatus further includes splash plates 50 associated with the tubes and shrouds, FIGS. 5 and 6, the splash plates having openings through which shrouds extend, with the tubes positioned therewithin. The shrouds and splash plates can be connected in any desired manner such as by welding. The splash plates are curvilinear to conform to the annular chamber 18, and have size and positionment with respect to the vaporizer tubes, all as described in greater detail in application Ser. No. 860,644, to optimally impinge the vapor streams on the splash plates.

Each vaporizer tube 40, as shown in greater detail in the aforesaid co-pending patent application, and in FIG. 6A herein, includes a stem portion 52 and a head portion generally indicated at 54. This head is of a generally curvilinear shape and includes, in one embodiment, two transverse leg portions or arm 54A, 54B, respectfully terminating in partly reversing vapor stream discharge opening 56A, 56B. The configuration shown includes two such leg portions extending in opposite direction and is generally referred to as a "double candy cane" or a "T-type". Vaporizer tubes can, however, include only a single arm or "candy cane" and various modifications in the exact structure can be effected. A fuel injector or tip portion 58 extends from the fuel inlet 38 for introducing fuel into the vaporizing tube or tubes, as will hereinafter appear. The shrouds 46 are spaced from the exterior of the stem portions of the tubes, as better seen from FIG. 6, by virtue of the outer diameter of the stems being smaller than the interior diameter of the shrouds. This construction provides an air channel at 60 operatably associated with opening 48, and air for cooling and for mixture with fuel in the annular burner is introduced therethrough from, for example, the compressor section. The foregoing description is general to the overall arrangement, and shown and described in greater detail in the aforesaid pending application.

As is pointed out in detail hereinafter, the present invention contemplates arrangements including, for example, double vaporizing tubes at each station, a divided passage or channel vaporizing tube, and different means operable to inject fuel selectively into and through the passages, the air being continually introduced through the plural channels or plural tubes. The present invention contemplates a plurality of fuel vaporizers for use in fuel vaporizing types of combustors for use in gas turbines, incorporating or using two or more of the vaporizing tubes located at substantially equal distances in the annular type of combustor. The number, of course, can vary according to the construction and operational characteristics desired.

As seen in FIG. 5, a plurality of vaporizing tubes, generally indicated 40, are arranged around and within the annular burner combustor, or annular vaporizing combustor 18. The splash plates 50, as pointed out above, are curvilinear elongated members for arrangement within the annular burner chamber, and of such dimensions as to substantially fill the spaces while leaving slight open or apertured areas for proper air and gas flow. In operation, fuel is introduced into a vaporizing tube, and air is introduced likewise into the tubes and through the channels 60, with an appropriate fuel/air ratio being directed through the vapor tube. This two-phase mixture passes through the vapor tube and exits from the discharge openings at the ends of the transverse leg portions, a certain amount of the fuel being vaporized while passing through the vaporizing tube. The fuel air mixture, upon exiting the vaporizing tube as an air, fuel vapor and liquid fuel stream is blown against the surface of a head plate or splash plate, and unburned liquid fuel is deposited, by aid of the air stream, in a thin film on the head plate or splash plate surface, from which it vaporizes and burns. Heat from combustion is continually supplied to the fuel film and the head plate material for example. It has been found that carbon deposits may form in the vicinity of the head plate or splash plate unless sufficient holes or openings are provided to supply air to these areas. This air presumably prevents locally overrich fuel/air regions in the primary zone. As pointed out hereinbefore, the formation of these carbon deposits creates undesired problems, inefficiency, and in some areas can result in failure of, or more rapid deterioration of the apparatus. The apparatus and method of the present invention are effective whereby carbon deposits can be efficiently burned in a gas turbine combustor. It is evident that to accomplish this result the carbon must be retained as a deposit with adequate residence time, and sequentially the supply of fuel is controlled or discontinued so that a very light fuel/air ratio stream is directed into, through, and out of the vaporizing tubes, or even air with no fuel therein, and this air provides the necessary oxygen to burn off the carbon deposits and/or soot formation which may be retained as a deposit on a head plate or splash plate surface.

In accomplishing this result different forms of apparatus and operation can be used. Shown in FIG. 2 is a design especially intended to burn heavy, highly carbonaceous fuels. Vaporizing tube 62 has a centrally positioned partition wall 64 in the interior thereof which extends substantially from the inlet 66 of the tube up to and terminating in the interior surface 68 of head 70. This vaporizer tube in use passes through a head plate 44, as in the other devices, and air, heated by the engine recuperator to 1,000°–1,400° F., for example, enters the combustor through the dual vaporizer tube as indicated by arrows 72. This flow is through each side or passage formed by the partition wall, and is approximately equal as regards flow rate through each side. Positioned above the partition 64 is fuel tube 74 which directs fuel into the dual vapor tube at a relatively low velocity. If no other provision were made, the fuel stream would strike the top of partition 64, and pass through the two halves of the dual vapor tube in roughly equal amounts. Two control air tubes 76 and 78 are positioned proximate the fuel tube, with the outlet or discharge openings therefrom positioned on either side of the fuel outlet, as shown in FIG. 2. Functionally, the role of these tubes is to control the direction of passage of fuel emitted from tube 74, and cause it to flow through one side or the other of the dual vapor tube at any given time. Generally such a condition is illustrated, with the fuel flow indicated as a stream at 80, the direction being caused by air stream 84 from control air tube 78. The air introduced into the air control tubes is preheated air from the engine recuperator. Means are provided for sequentially and selectively passing air through the tubes 76 and 78 whereby the fuel stream will selectively pass into one or the other of the channels or passages, and thence a combined or composite fuel-air will flow through the tube passage, through the discharge openings 56A–56B, and be directed, as shown by arrows 84, as a vapor stream which impinges upon the splash plate generally indicated at 86. The air or fuel-air mixture exiting from the vaporizer legs or arms will, as seen, be directed to impinge against the face or surface of the splash plate.

These surfaces 88 and 90, in this form, are provided with projections 92, although the face could consist of smooth porous material, or grooves could be formed in the surface. The purpose of these projections, grooves, etc. is to encourage the heavy fractions of the fuel to form a secure deposit on the surface, and to increase the surface area of the deposit on the surface, and to increase the surface area of the deposit to encourage burn off. Under some circumstances it might be desirable, although not necessary, to make the dual vaporizing tube and splash plate of a ceramic material, such as silicon carbide. The flow of the vapor stream subsequent to impingement upon this surface of the splash plate is indicated by a plurality of small arrows generally designated 94. These arrows indicate the gas flow resulting from substantial combustion and vaporization of the fuel and/or carbon, and/or soot, which may have been deposited or formed on the rough or variegated surface of the splash plate. The operation of this form of the invention as also in possible modifications are all adapted to sequentially introduce rich and lean fuel/air mixtures into the vaporizer tubes, with the end result being substantially the same, i.e., serving to burn off carbon formed as deposits on the splash plate, and accordingly to obtain substantial combustion of low volatility fuels.

Operation of the apparatus of FIG. 2 is as follows: Air, from the compressor outlet, is selectively fed through one control air tube 76, 78. This flow of air will force the fuel stream from fuel tube 74 to the opposite side of the dual vapor tube as shown at 80 from whence, mixed with the air which flows equally through both sides at all times, it will exit from the leg on that side of the vaporizing tube, and be directed to impinge upon the splash plate surface 88. Upon this impingement on and against the surface, more volatile portions of the fuel will vaporize and burn. The heavier portions of the fuel, however, will remain on the surface and form a deposit, the roughened surface configuration, or material, increasing deposit formation.

After a desired period of time, flow of the air through the tube 78, for example, will cease and flow of the same nature will pass through control tube 76. This switching can be effected by an external control valve of any known type, and which preferably is removed from the severe environment within the combustor. The fuel will now be blown to the opposite side of the dual vapor tube from whence it will exit from the arm opposite the first discharge, and be directed against surface 90 of the splash plate in a manner similar to that previously described. When this occurs, hot air with little or no fuel will flow through the previous side of the vapor tube, exit from the arm on that side, and be directed against surface 88. This hot, highly oxidizing stream will strike against hot carbon deposits on the surface 88 and cause these carbon deposits to burn. A similar action takes place as regards any carbon deposits which may have been formed within the vapor tube passages. After a time required to substantially fully oxidize the carbon deposits, the fuel flow will again be switched, and this action will be repeated as long as the engine is operating. The time required for reasonable deposits to form and to be oxidized will probably need empirical determination, depending upon the exact operational conditions and the fuels used. These times additionally will determine the switching cycle time.

In the above described operation, it is assumed that the carbon deposits will oxidize at an equal or faster rate than they are formed. Should the oxidation time be slower than formation, it may be necessary to add additional vaporizing tubes and to completely stop fuel flow to one or more of the vaporizing tubes in some sequencing action. Caution is indicated as regards this concept because of possible undesirable effects on combustor outlet temperature spread.

An alternate vapor tube arrangement is shown in FIGS. 5 and 6 where, instead of using control air tubes to switch the fuel flow, two fuel vaporizing tubes 96 and 98 are used. The injection of fuel and air will be the same into each of these vaporizing tubes, but in operation one of two fuel tubes could operate selectively to inject fuel into the multiple vapor tubes located in close proximity, and the vapor tubes could alternately receive rich or lean mixtures, so that while one or the other vaporizer tube receives a rich fuel mixture the other receives a lean mixture so as to purge the tube to prevent internal carbon deposits. If desired two "J"-shaped vapor tubes could be used instead of the double tubes shown in FIG. 5, or instead of a two passage vapor tube as shown in FIG. 2.

In FIGS. 3 and 3A the vaporizing tube 100 constitutes a double passage tube similar to that of FIG. 2. A difference resides in the use of two fuel tubes 102 and 104. One fuel tube would inject fuel into one side or passage of the dual vapor tube, while the other fuel tube would be shut off and purged to prevent internal carbon deposits. Care must be taken in this form since a possible build up of carbon deposits within the fuel tubes may occur in spite of the purging action. A valving mechanism generally designated 106, with control means 108, will serve to shift fuel flow from line 110 leading to fuel nozzle 102, to line 112 leading to fuel nozzle 104, the common fuel inlet line being designated 114 and a discharge or bypass line 116. Any known switching mechanism can be used in this operation.

A further modification is shown in FIGS. 4 and 4A, wherein a dual passage vaporizing tube 118 is shown, and a single fuel injector tube 120 is operatively mounted for oscillation so as to selectively discharge into either passage 118A or passage 118B, the function and operation being substantially identical to the other forms. The oscillating mechanism generally designated 122 can consist of any known type control through, for example, arm or lever 124. A common fuel inlet tube is shown at 126. This latter apparatus would require a mechanical linkage (not shown) to gang all of the fuel tubes in an annular configuration, for example, and may require special seals, such being well known in the art. An oscillatory mount is generally indicated at 128.

Recapitulating in part, the apparatus and operation thereof can specifically differ but the underlying concepts remain the same. The invention teaches a combustor to provide means of efficiently burning high viscosity, high carbon/hydrogen ratio hydrocarbon fuels including residual fuels, low grade synfuels and coal-oil slurries. Heavy and highly carbonaceous portions of fuel can be efficiently burned in a gas turbine combustor. The carbon deposits and soot formation are retained as a deposit on a splash plate surface. Air preheated by the engine recuperator in one form enters the combustor through a dual vapor tube, divided by a partition wall to provide approximately equal flow rates of air at all times through each exit side. Fuel is directed alternately to each side of the vapor tube, using a switchable external control valve. Two separate air control tubes located in the vicinity of the fuel entrance tube deflect fuel flow emitted from the fuel tube, alternately forcing it to flow out through either side of the dual vapor tube exit as directed by a control valve at any given time. The dual vapor tube provides an air stream flow out on one side and simultaneously a fuel-/air mixture is flowing out on the opposite side, wherein flow from each side is directed against a splash plate surface. The air stream flowing out on one side of the dual vapor tube is controlled alternately, and provides the necessary oxygen to burn off carbon deposits previously formed by impingement of the fuel against the surface of the splash plate. In order to provide sufficient time for burning of the carbon deposit, splash plate surfaces may be made with rough projections, grooved, or of some porous material. The projections, grooves, etc., encourage heavy fractions of the fuel to form a secure deposit, and additionally increase the surface area of the deposit to help the burn off.

Alternative apparatus can be used. Instead of using two controlled air tubes to switch fuel flow, for example, two fuel tubes can be used where one tube injects fuel into one side of the dual vapor tube, while the other fuel tube is shut off and purged, to prevent internal carbon deposits.

A second alternative uses a single fuel tube for each dual vapor tube and which is oscillated through a few degrees to alternately spray fuel to either tube exit. A mechanical linkage rotates all fuel tubes located in the combustor in an annular configuration.

A third alternative involves the use of two vapor tubes located in radial side-by-side positions. The two vapor tube stems abut. Each vapor tube is essentially the same as a two arm of "T" shaped design. Fuel is alternately delivered to one vapor tube at a time by control means. The advantages of this form are to reduce thermal stress, and retention of good combustor exit temperature spread.

A fourth alternative arrangement can be applied to any of the different dual vapor tubes. Instead of switching all or most of the fuel flow, a small controlled flow of fuel is always retained through both tubes, or both sides of a single vapor tube. Consequently, the air/fuel ratio in the two sides of the vapor tube is changing. The side containing the large flow of fuel builds the deposit; the side with less fuel is highly oxidizing, perhaps containing some fuel but a lean mixture to provide continued heat to promote burnoff of the deposit. The relative amounts of fuel through each side of the dual vapor tubes in operation would be determined empirically.

While preferred forms have been shown and described herein, manifestly minor changes can be effected without departing from the spirit and scope of the invention as defined in, and limited solely by, the appended claims. For example, while the invention has been described as it might apply to an annular type of combustor, it is apparent that similar or other combustor means could be applied of different configurations.

What is claimed is:

1. A method of burning heavy and highly carbonaceous portions of fuel in a gas driven turbine, comprising, introducing fuel and air in an appropriate air-fuel ratio mixture into a vaporizing combustor of a gas driven turbine during a continuing operational phase thereof and subjecting the mixture to heat for at least partial vaporization of the fuel, impinging the partially vaporized mixture against a hot surface, with liquid fuel remaining in the partially vaporized mixture being deposited in a thin film on the hot surface with the more volatile portions of the so deposited liquid fuel thereupon vaporizing and burning, the heavier portions of the so deposited liquid fuel remaining on the surface and forming a carbon deposit thereon, and thereafter, during sustained turbine operation, selectively controlling, by a continuous cyclic reduction or cessation of fuel flow, flowing a stream of hot air with little or no fuel therein against the hot surface and the hot carbon deposits thereon, the hot and highly oxidizing air in the so selectively controlled fuel and air stream causing the hot carbon deposits to oxidize and burn.

2. A method as claimed in claim 1, wherein the air-fuel mixture and hot air stream are selectively sequentially flowed onto the hot surface whereby a carbon deposit will initially build up, and subsequently the air in the hot air stream will cause oxidation and burning of the carbon deposit.

3. A method as claimed in claim 2, wherein the sequential cycle is such that the carbon deposit is retained on the surface a sufficient time subjected to the hot air stream to substantially completely oxidize and burn.

4. A method of burning heavy and highly carbonaceous portions of fuel in a gas driven turbine, comprising, introducing a fuel and air mixture in an appropriate air-fuel ratio through vapor tube means into a vaporizing combustor of a gas driven turbine during operation thereof, blowing, as a stream, the introduced mixture against a heated splash plate surface, with liquid fuel remaining in the partially vaporized mixture being deposited by aid of the stream in a thin film on the heated splash plate surface, the more volatile portions of the so deposited liquid fuel in the mixture thereupon vaporizing and burning, heavier portions of the so deposited liquid fuel remaining on the surface and forming a carbon deposit thereon, and thereafter, during sustained turbine operation and sequentially with the so blown mixture stream, selectively controlling, by a continuous cyclic reduction or cessation of fuel flow, flowing of hot air from a compressor outlet with little or no fuel content against the splash plate surface and hot carbon deposits thereon, the hot, highly oxidizing airs in the hot air flow, causing the hot carbon deposits to oxidize and burn.

5. A fuel vaporizing tube means adapted for operative positionment in a vaporizing combustor, said tube means including dual passages operable for receiving a stream of fuel, air, and fuel/air mixtures for subsequent introduction into a combustor for fuel vaporization and burning therein, and means operable to selectively vary the fuel content in the stream as introduced into one of the respective passages with respect to that introduced into the other to thereby selectively control fuel content input from each passage to a combustor.

6. A fuel vaporizing tube as claimed in claim 5, said tube means including a single open bottom hollow stem, said stem terminating in a head portion, a divider in said stem terminating in the interior of said head portion and dividing said stem and said head portion into discrete dual passages, said head portion having dual discharge outlets connected respectively to said dual passages.

7. A fuel vaporizing tube as claimed in claim 5, said tube means including two vaporizing tubes placed adjacent one another and respectively adapted to selectively receive controlled fuel streams and introduce the same into a combustor.

8. In a fuel vaporizing tube means as claimed in claim 5, said selective fuel controlling means including fuel injection nozzle means, said nozzle means being operable to selectively introduce fuel into one or the other, or both, of said passages, and air stream means continually introducing air into both said passages whereby the fuel content discharged from each passage to a combustor is selectively controllable.

9. In a fuel vaporizing tube means as claimed in claim 8, said nozzle means comprising separate fuel nozzles for each said passage and means for selective controlled introduction of fuel therefrom into said passages alternately or simultaneously.

10. In a fuel vaporizing tube means as claimed in claim 8, said nozzle means comprising a single oscillatable nozzle, said nozzle being controllably positionable to selectively alternatively introduce fuel into said passages.

11. In a fuel vaporizing tube means as claimed in claim 8, said nozzle means including a fuel nozzle having a discharge outlet positioned above and proximate said passages, air control tubes positioned on opposite sides of said discharge outlet, means for introducing air under pressure into said air control tubes, said tubes having discharge outlets angled toward the fuel nozzle discharge outlet, said air introduction means being operable to selectively and alternately introduce air into said tubes whereby air discharged from the discharge outlets will deflect a fuel stream emitted from said fuel nozzle into one or the other of said tubes.

12. In a fuel vaporizing tube means as claimed in claim 5, said dual passages having discharge outlets therefrom, said passages and fuel mixtures passing therethrough being subjected to heat for partial fuel vaporization, the resultant mixture being dischargable from said discharge outlets as a vapor stream consisting of air, vaporized fuel, and liquid fuel, a splash plate positioned to receive said vapor stream, said splash plate being heated and operable to vaporize lighter fuel portions in said stream with heavier fuel portions being deposited as carbon on said splash plate, selective impingement of low fuel content vapor from a said passage, resulting from introduction thereinto of a low fuel content mixture, or of a substantially no fuel content, serving to oxidize the carbon with resultant burning thereof.

13. In a fuel vaporizing tube means as claimed in claim 12, said splash plate having a vapor stream receiving surface of enhanced carbon retention properties to permit a required time period of retention for oxidizing and substantial burning off of said carbon deposit.

14. In a vaporizing combustor, a dual phase vaporizer tube means including dual passages, means for selectively alternately introducing into said passages of said tube means rich fuel content mixtures including low volatile heavy fuel components, and sequentially an air or air-fuel mixture of low fuel content, fuel in the introduced mixtures passing through said passages in said tube means being in part vaporized, heated fuel vaporizing surface means in said combustor, said tube having discharge arms operable to direct and impinge the resultant discharged selectively controlled fuel, fuel vapor, and air as a stream onto said vaporizing surface, where the more volatile fuel components in the fuel mixture will vaporize and burn, while less volatile heavy fuel components therein will form hot carbon deposits on the vaporizing surface, the subsequent sequential low fuel content of air introductions into said passages in said tube means resulting in a discharge therefrom of hot, highly oxidizing air streams and impingement thereof onto the carbon deposits on said vaporizing surface, and promoting substantial oxidization and burning thereof.

15. In a vaporizing combustor as claimed in claim 14, said tube means including a single open bottom hollow stem, said stem terminating in a head portion, a divider in said stem terminating in the interior of said head portion and dividing said stem and said head portion into said dual passages, said head portion having said dual discharge arms with outlets connected respectively to said dual passages.

16. In a vaporizing combustor as claimed in claim 14, said selective fuel controlling means including fuel injection nozzle means, said nozzle means being operable to selectively introduce fuel into one or the other, or both, of said passages, and air stream means continually introducing air to both said passages, whereby the fuel content discharged from each passage to a vaporizer surface is controllable.

17. In a vaporizing combustor as claimed in claim 16, said nozzle means comprising separate fuel nozzles for each said passage and means for selective controlled introduction of fuel therefrom into said passages alternately or simultaneously.

18. In a vaporizing combustor as claimed in claim 16, said nozzle means comprising a single oscillatable nozzle, said nozzle being controllably positionable to selectively alternately introduce fuel into said passages.

19. In a vaporizing combustor as claimed in claim 16, said nozzle means including a fuel nozzle having a discharge outlet positioned above and proximate said passages, air control tubes positioned on opposite sides of said discharge outlet, means for introducing air under pressure into said air control tubes, said tubes having discharge outlets angled toward the fuel nozzle discharge outlet, said air introduction means being operable to selectively and alternately introduce air into said tubes whereby air discharged from the discharge outlets will deflect a fuel stream emitted from said fuel nozzle into one or the other of said tubes.

20. In a vaporizing combuster as claimed in claim 14, said dual passages having discharge outlets therefrom, said passages and fuel mixtures passing therethrough being subjected to heat for partial fuel vaporization, the resultant mixture being dischargeable from said discharge outlets as a vapor stream consisting of air, vaporized fuel, and liquid fuel, a splash plate positioned to receive said vapor stream, said splash plate being heated and operable to vaporize lighter fuel portions in said stream with heavier fuel portions being deposited as carbon on said splash plate, selective impingement of low fuel content vapor from a said passage, resulting from introduction thereinto of a low fuel content mixture, or a substantially no fuel content, serving to oxidize the carbon with resultant burning thereof.

21. In a vaporizing combustor as claimed in claim 20, said splash plate having a vapor stream receiving surface of enhanced carbon retention properties to permit a required time period of retention for oxidizing and substantial burning off of said carbon deposit.

22. A fuel vaporizing tube means adapted for operative positionment in a vaporizing combustor, said tube means including dual passages operable for receiving a stream of fuel, air and fuel/air mixtures for subsequent introduction into a combustor for fuel vaporization and burning therein, means for selectively controlling fuel content in the stream as introduced into the respective passages to thereby control fuel content input from each passage to a combustor, said selective fuel controlling means comprising a single oscillatable fuel injection nozzle, said nozzle means being controllably positionable and operable to selectively introduce fuel into one or the other, or both, of said passages, alternately or simultaneously, and air stream means continually introducing air into both said passages whereby the fuel content discharged from each passage to a combustor is controllable.

23. A fuel vaporizing tube means adapted for operative positionment in a vaporizing combustor, said tube means including dual passages operable for receiving a stream of fuel, air, and fuel/air mixtures for subsequent introduction into a combustor for fuel vaporization and burning therein, means for selectively controlling fuel content in the stream as introduced into the respective passages to thereby control fuel content input from each passage to a combustor, said selective fuel controlling means comprising a fuel injection nozzle having a discharge outlet positioned above and proximate said passages, air control tubes positioned on opposite sides of said discharge outlet, means for introducing air under pressure into said air control tubes, said tubes having discharge outlets angled toward the fuel nozzle discharge outlet, said air introduction means being operable to selectively and alternately introduce air into said tubes whereby air discharged from the discharge outlets will deflect a fuel stream emitted from said fuel nozzle into one or the other of said tubes whereby the fuel content discharged from each passage to a combustor is controllable.

24. In a vaporizing combustor, a dual phase vaporizer tube means, means for selectively alternately introducing into said tube means rich fuel content mixtures including low volatile heavy fuel components, and sequentially subsequent air or air-fuel mixtures of low fuel content, fuel in the introduced mixtures passing through said tube means being in part vaporized, heated fuel vaporizing surface means in said combustor, said tube having discharge arms operable to direct and impinge the resultant discharged fuel, fuel vapor, and air as a stream onto said vaporizing surface, where the more volatile fuel components in the fuel mixture will vaporize and burn, while less volatile heavy fuel components therein will form hot carbon deposits on the vaporizing surface, subsequent sequential low fuel content of air introductions into said tube resulting in a discharge therefrom of hot, highly oxidizing air streams and impingement thereof onto the carbon deposits on said vaporizing surface, and promoting substantial oxidization and burning thereof, said selective fuel controlling means including fuel injection nozzle means, said nozzle means comprising a single oscillatable nozzle, said nozzle being controllably positionable and operable to selectively alternately introduce fuel into one or the other, or both, of said passages, and air stream means continually introducing air to both said passages, whereby the fuel content discharged from each passage to a vaporizer surface is controllable.

25. In a vaporizing combustor, a dual phase vaporizer tube means, means for selectively alternately introducing into said tube means rich fuel content mixtures including low volatile heavy fuel components, and sequentially subsequent air or air-fuel mixtures of low fuel content, fuel in the introduced mixtures passing through said tube means being in part vaporized, heated fuel vaporizing surface means in said combustor, said tube having discharge arms operable to direct and impinge the resultant discharged fuel, fuel vapor, and air as a stream onto said vaporizing surface, where the more volatile fuel components in the fuel mixture will vaporize and burn, while less volatile heavy fuel components therein will form hot carbon deposits on the vaporizing surface, subsequent sequential low fuel content of air introductions into said tube resulting in a discharge therefrom of hot, highly oxidizing air streams and impingement thereof onto the carbon deposits on said vaporizing surface, and promoting substantial oxidization and buring thereof, nozzle means including a fuel nozzle having a discharge outlet positioned above and proximate said passages, air control tubes positioned on opposite sides of said discharge outlet, means for introducing air under pressure into said air control tubes, said tubes having discharge outlets angled toward the fuel nozzle discharge outlet, said air introduction means being operable to selectively and alternately introduce air into said tubes whereby air discharged from the discharge outlets will deflect a fuel stream emitted from said fuel nozzle into one or the other of said tubes.

* * * * *